United States Patent
Fayssal (10) Patent No.: US 9,232,427 B2
(45) Date of Patent: Jan. 5, 2016

(54) MULTI-MODE WIRELESS NETWORKING SYSTEM AND METHOD

(71) Applicant: GFI Software IP S.á.r.l., Luxembourg (LU)

(72) Inventor: Samer Nabih Fayssal, Dunedin, FL (US)

(73) Assignee: LOGICNOW LIMITED, Dundee (GB)

( * ) Notice: Subject to any disclaimer, the term of this patent is extended or adjusted under 35 U.S.C. 154(b) by 99 days.

(21) Appl. No.: 13/890,380

(22) Filed: May 9, 2013

(65) Prior Publication Data

US 2014/0334316 A1 Nov. 13, 2014

(51) Int. Cl.
*G01R 31/08* (2006.01)
*H04W 4/00* (2009.01)
*H04W 24/10* (2009.01)
*H04W 84/12* (2009.01)

(52) U.S. Cl.
CPC .............. *H04W 24/10* (2013.01); *H04W 84/12* (2013.01)

(58) Field of Classification Search
CPC . H04W 24/10; H04W 24/02; H04W 36/0027; H04W 84/12; H04L 41/0816; H04L 41/0866
USPC ......... 370/216–220, 241–244, 395.21, 395.4, 370/331, 329, 419, 420
See application file for complete search history.

(56) References Cited

U.S. PATENT DOCUMENTS

| | | | |
|---|---|---|---|
| 8,196,199 B2 | 6/2012 | Hrastar | |
| 8,213,302 B2 | 7/2012 | Wang | |
| 2008/0285483 A1 | 11/2008 | Gil | |
| 2013/0014263 A1* | 1/2013 | Porcello et al. | 726/25 |
| 2013/0016628 A1 | 1/2013 | Bertani | |
| 2014/0153735 A1* | 6/2014 | Fujioka | 381/74 |
| 2014/0307587 A1* | 10/2014 | Fayssal | 370/255 |
| 2014/0341043 A1* | 11/2014 | Prydekker et al. | 370/241 |

* cited by examiner

*Primary Examiner* — Hanh N Nguyen
(74) *Attorney, Agent, or Firm* — Johnson & Martin, P.A.; James David Johnson (57) ABSTRACT

A method is provided for controlling a wireless network interface controller (WNIC) to analyze one or more network conditions with little or no interruption to network connectivity or data communication. The WNIC may collect information regarding wireless channels, networks, and/or users. The method uses ideal network time slots and selective data collection to monitor wireless networks with minimal interruptions to normal operation. A system is provided for operating and controlling the WNIC in accordance with the method.

20 Claims, 3 Drawing Sheets

MULTI-MODE WIRELESS NETWORKING SYSTEM AND METHOD

FIELD OF THE INVENTION

The invention relates to wireless networks. More particularly, the invention relates to monitoring conditions and communications of wireless networks.

BACKGROUND

Modern computing involves communication among electronic devices. This communication may occur over a network, or a collection of computers and other electronic hardware interconnected by communication channels. Many homes and offices have a number of computers connected via a local area network (LAN). Computers may be networked in the LAN via a wired or wireless network. A wireless local area network (WLAN) is established using a device known as wireless router. The wireless router mostly provides local area network access to wirelessly connect client devices such as notebook/laptop computers, smart phones, tablets, and other portable computer devices.

A client device typically connects to a network using a network interface controller. To connect to a wireless network, a client device typically uses a wireless network interface controller. A wireless network interface controller is a hardware chipset that is typically manufactured by different vendors along with specifically designed software known as a driver. A driver is usually created for a specific piece of hardware. The wireless network interface controller driver provides a medium for the wireless network interface controller hardware to receive instructions and operate within a specific operating system. An operating system is software that manages the computer hardware, for example, Windows, Linux, and Apple Macintosh OS.

A wireless networking card typically has a radio transceiver with limited transmission power, which limits the maximum range of the wireless network interface controller. The wireless network interface controller can measure a received signal of a wireless router. The received signal can be quantified by the wireless network interface controller using a received signal strength index (RSSI). The data transmission and reception rate between two devices connected to a wireless network is directly proportional to the RSSI. To maintain a minimum level of communication performance, a minimum RSSI must be maintained. The transmission and reception speed of the radio transceiver in each device communicating with one another also affects the data transmission and reception rate.

A wireless network interface controller and its driver follow a communication protocol to connect to the wireless router. Typically, the communication protocol is adherent to the IEEE 802.11 standard, which is created by the Institute for Electrical and Electronic Engineers to facilitate communication between various wireless devices.

The wireless network interface controller may transmit and receive bits of data on a channel defined by the IEEE 802.11 standard. Each channel includes a radio frequency range. To allow an effective communication, both communicating devices may set their transceiver radios to communicate over the same channel. As more devices are added to a channel, the increasing volume of data broadcast over the channel may cause the channel to become congested. For example, each wireless network interface controller set to communicate over a channel receives all data broadcast on that channel. A wireless network interface controller then must filter out the data that is not intended to receive, causing transmission delays and operational inefficiencies. To determine whether a packet of data is intended for a particular wireless network interface controller, a Medium Access Control (MAC) address may be used and analyzed. If the wireless network interface controller does not possess a MAC address that corresponds to the broadcast communication, the contents of that communication may be disregarded, thus wasting the time and energy required to detect and receive the unnecessary data.

A wireless network interface controller can change the channel on which it communicates data, allowing a device to communicate on less congested frequencies. However, as the wireless network interface controller seeks a new channel and/or wireless router, the device will generally be unable to transmit or receive data communications. This disruption of data communication may cause some networked services to fail, for example, Voice-Over-IP (VOIP) telecommunications. The wireless network interface controller typically includes a mode control switch, which controls the operation of the wireless network interface controller between a managed mode, in which data is communicated among devices, and a monitor mode, in which the wireless network interface controller receives data transmitted from other devices to analyze a channel or network. This disparate operation of a wireless network interface controller between a managed mode and a monitor mode causes disadvantageous connection drops, service interruptions, and network disconnections.

What is needed is a system to operate a wireless network interface controller that can provide the network monitoring features of operating in monitor mode, while not disallowing the data communication features of operating in managed mode. What is needed is a system that can seamlessly switch operation of a wireless network interface controller between managed mode and monitor mode to allow analysis of network conditions while maintaining a virtually uninterrupted connection for data communication. What is needed is a method to analyze the network communication needs of a system and monitor network conditions without disrupting the communication needs.

SUMMARY

According to embodiments of the present invention, a system is provided that can operate a wireless network interface controller to advantageously provide the network monitoring features of operating in monitor mode, while not disallowing the data communication features of operating in managed mode. According to an embodiment of the present invention, a system is provided that can seamlessly switch operation of a wireless network interface controller between managed mode and monitor mode to allowing analysis of network conditions while maintaining a virtually uninterrupted connection for data communication. According to an embodiment of the present invention, a method is provided to analyze the network communication needs of a system and monitor network conditions without disrupting the communication needs.

In one aspect, a system is provided for managing a wireless network interface controller. The system may include a management engine, a monitor engine, and a control engine. The management engine may control communication of data over a wireless network using the wireless network interface controller operating in a managed mode. The monitor engine may analyze a condition of the wireless network using the wireless network interface controller operating in a monitor mode. The control engine may control operation of the management engine and the monitor engine in compliance with a data communication threshold. User mode scanning is performable by the management engine to determine a general characteristic of the wireless network in the managed mode. The user mode scanning does not significantly affect the compliance with the data communication threshold. Wireless network traffic information is detectable by the wireless network interface controller operating in the monitor mode. The control engine may selectively enable the managed mode and the monitor mode by manipulating a mode control switch of the wireless network interface controller.

In another aspect, the data communication threshold may target performance with approximately no perceivable interruptions of connectivity to the wireless network caused by changing operation between the managed mode and the monitor mode.

In another aspect, the data communication threshold may be alterable to reflect an aggressiveness stage. A high aggressiveness stage may prioritize efficiently operating in the monitor mode. A low aggressiveness stage may prioritize efficiently operating in the managed mode.

In another aspect, compliance with the data communication threshold may be determined by the system where an actual period between a precedent communication of data and a subsequent communication of data is longer than an anticipated period to engage the monitor mode, monitor the wireless network in the monitor mode, engage the managed mode, and connect to the wireless network in the managed mode. The anticipated period may be determined by assessing usage of the wireless network. The anticipated period may include a mode time of changing between the managed mode and the monitor mode. The anticipated period may include a connection time of the wireless network interface controller connecting to the wireless network in the managed mode.

In another aspect, assessing the usage of the wireless network may dynamically be determined by analyzing usage patterns, quality of service requirements, and acceptable network error rates.

In another aspect, the system may control the wireless network interface controller by operating a driver.

In another aspect, a list of wireless networks may be generated and populated with a wireless network on a selected channel. The list of wireless networks may be prioritized to efficiently analyze the condition of a wireless network in the list of wireless networks.

In addition, a method aspect of the present invention may be provided for operating a wireless network interface controller. The method may be performed on a computerized device with a processor and memory. The method may include (a) controlling a wireless network interface controller between a managed mode and a monitor mode by manipulating a mode control switch of the wireless network interface controller to operate in compliance with a data communication threshold. The method may also include (b) controlling communication of data over a wireless network using the wireless network interface controller while operating in the managed mode. Additionally, the method may include (c) performing user mode scanning while operating in the managed mode to determine a general characteristic of the wireless network. Furthermore, the method may include (d) analyzing a condition of the wireless network using the wireless network interface controller while operating in the monitor mode.

According to the method, user mode scanning may not significantly affect compliance with the data communication threshold. The data communication threshold may target performance with approximately no perceivable interruptions of connectivity to the wireless network caused by changing operation between the managed mode and the monitor mode. Wireless network traffic information may be detectable by the wireless network interface controller operating in the monitor mode. Additionally, changing between the managed mode and the monitor mode of step (a) may further involve: (e) engaging the monitor mode, (f) analyzing the wireless network in the monitor mode, (g) engaging the managed mode, and (h) connecting to the wireless network in the managed mode.

In another aspect, the data communication threshold may be alterable to reflect an aggressiveness stage. A high aggressiveness stage may prioritize efficiently operating in the monitor mode. A low aggressiveness stage may prioritize efficiently operating in the managed mode.

In another aspect, determining the compliance with the data communication threshold may involve (i) assessing usage of the wireless network; (j) assessing a mode time of changing between the managed mode and the monitor mode; (k) assessing a connection time of the wireless network interface controller to connect to the wireless network in the managed mode; (l) analyzing assessments of steps (i), (j), and (k) to determine an anticipated period; and (m) determining compliance with the data communication threshold where an actual period between a precedent communication of data and a subsequent communication of data is longer than the anticipated period.

In another aspect, assessing the usage of the wireless network may be dynamically determined by analyzing usage patterns, quality of service requirements, and acceptable network error rates.

In another aspect, the method may further involve (n) controlling the wireless network interface controller by operating a driver.

In another aspect, the method may further involve (o) generating a list of wireless networks; (p) populating the list of wireless networks with a wireless network on a selected channel; (q) prioritizing the list of wireless networks to efficiently analyze the condition of each wireless network in the list of wireless networks; and (r) analyzing a wireless network in the list of wireless networks.

A method aspect of the present invention is provided for operating a wireless network interface controller. The method may be performed on a computerized device with a processor and memory. The method may include (a) controlling a wireless network interface controller between a managed mode and a monitor mode by manipulating a mode control switch of the wireless network interface controller to operate in compliance with a data communication threshold. The method may also include (b) controlling communication of data over a wireless network using the wireless network interface controller while operating in the managed mode. Additionally, the method may include (c) performing user mode scanning while operating in the managed mode to determine a general characteristic of the wireless network. Furthermore, the method may include (d) analyzing a condition of the wireless network using the wireless network interface controller while operating in the monitor mode.

In another aspect, the user mode scanning may not significantly affect the compliance with the data communication threshold. Changing between the managed mode and the monitor mode of step (a) further may further involve (e) engaging the monitor mode, (f) analyzing the wireless network in the monitor mode, (g) engaging the managed mode, and (h) connecting to the wireless network in the managed mode. Determining the compliance with the data communication threshold may involve (i) assessing usage of the wireless network; (j) assessing a mode time of changing between the managed mode and the monitor mode; (k) assessing a connection time of the wireless network interface controller to connect to the wireless network in the managed mode; (l) analyzing assessments of steps (i), (j), and (k) to determine an anticipated period; and (m) determining compliance with the data communication threshold where an actual period between a precedent communication of data and a subsequent communication of data is longer than the anticipated period.

In another aspect, the data communication threshold may target performance with approximately no perceivable interruptions of connectivity to the wireless network caused by changing operation between the managed mode and the monitor mode.

In another aspect, wireless network traffic information may be detectable by the wireless network interface controller operating in the monitor mode.

In another aspect, the data communication threshold may be alterable to reflect an aggressiveness stage. A high aggressiveness stage may prioritize efficiently operating in the monitor mode. A low aggressiveness stage may prioritize efficiently operating in the managed mode.

In another aspect, assessing the usage of the wireless network may be dynamically determined by analyzing usage patterns, quality of service requirements, and acceptable network error rates.

In another aspect, the method may further involve (n) controlling the wireless network interface controller by operating a driver.

In another aspect, the method may further involve (o) generating a list of wireless networks; (p) populating the list of wireless networks with a wireless network on a selected channel; (q) prioritizing the list of wireless networks to efficiently analyze the condition of each wireless network in the list of wireless networks; and (r) analyzing a wireless network in the list of wireless networks.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more"

to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The present invention will now be described in detail with reference to embodiments thereof as illustrated in the accompanying drawings. In the following description, a multi-mode wireless networking system and method will be discussed. Those of skill in the art will appreciate alternative labeling of the multi-mode wireless networking system and method as a networking system, multi-mode networking system, control wireless monitoring system, wireless communication method, system for management of wireless network interface controllers, system, method, the invention, or other similar names. Skilled readers should not view the inclusion of any alternative labels as limiting in any way.

The multi-mode wireless networking system will now be discussed. The system may be operated one or more wireless networking devices to increase performance of data communication over a wireless network. For example, the system may be used to control operation of a wireless network interface controller to communicate data over a wireless network and scan one or more additional wireless network to determine an optimal connection. Used throughout this disclosure, data communication is defined to include transmission and reception of data, without limitation. A wireless networking device is discussed throughout this disclosure in the context of a client device or wireless router, but may also include any device capable of communicating over a wireless network. Additional wireless networking devices may include additional client devices, such as desktop computers, notebook/laptop computers, printers, smartphones, network attached storage (NAS) devices, tablets, music players, televisions, audiovisual equipment, other electronic devices, and other devices that would be apparent to a person of skill in the art Skilled artisans will appreciate that wireless networking devices may include at least one wireless network interface controller.

The wireless network interface controller will now be discussed Skilled artisans will appreciate that the term wireless network interface controller, wireless networking interface controller, wireless networking card, network adapter, LAN adapter, and other similar terms may be used interchangeably, without limitation. A network interface controller is a computer hardware component that allows communication of a computerized device over a network. The network interface controller may receive data from various components of a computerized device, which it may then relay over a network. Similarly, the network interface controller may receive data from a network connection, which it may then relay to various components of the computerized device. A network interface controller may operate over a physically connected local area network (LAN) or wirelessly over a wireless local area network (WLAN).

A wireless network interface controller operates similarly to that of a traditional network interface controller, with the additional capability to communicate data wirelessly. Generally, a wireless network interface controller will include one or more radio transceivers, which may broadcast and receive radio signals over the air. A wireless network interface controller may communicate data with other devices using one or more data transmission protocols, for example, but not limited to, IEEE 802.11 Wi-Fi, token ring networks, Bluetooth, or other network protocols that would be apparent to a person of skill in the art. In the interest of clarity, the present invention will be discussed in the context of the IEEE 802.11 protocols without limitation.

As will be apparent to those of skill in the art, IEEE 802.11 defines various frequency ranges at which data may be transmitted, which are segmented into channels. Various devices may communicate different packets of data using a single channel. Additionally, some channels defined by the IEEE 802.11 specification overlap with other channels. As more data communications are broadcast over the same frequency ranges, congestion may occur and degrade communication rates and connectivity.

Throughout this disclosure, communication of data is discussed as occurring over a wireless network. A wireless network is any type of connection between two or more electronic devices to communicate data or information without being physically attached by wires or cables. For example, a wireless network may be a wireless local area network (WLAN). A WLAN is typically a wireless network established to provide communication between two or more wireless devices within a moderately short distance from a managing device, such as a wireless router. As discussed above, a WLAN may be compliant with a standard such as IEEE 802.11, communicate using a proprietary standard, and/or use another protocol that would be apparent to a skilled artisan. The WLAN may communicate with one or more wired device through the use of a wireless bridge, as may be proved by a wireless router. For example, a wireless device may wirelessly communicate with the wireless router, which may then relay the communication to a wired electronic device via a cable, such as an Ethernet cable.

To communicate data between a transmitting wireless device and a receiving wireless device, the communication must generally be made over the same channel. A wireless network interface controller may receive virtually every bit communicated over a given channel, assuming the transmitting device is within range of the receiving device, including data intended for different wireless devices. To direct transmitted data to the intended recipient, a medium access control (MAC) address may associate the data transmitted with an intended wireless device. Skilled artisans will be familiar with MAC addresses and use of the same in network communications.

A wireless network interface controller may operate in a variety of modes to communicate data, analyze network conditions, receive network traffic data, or otherwise gather data relating to one or more network. A wireless network interface controller may operate in a monitor mode or a managed mode. In monitor mode, the wireless network interface controller may receive data relating to one or more condition of a network environment, even if the data is intended for different wireless devices. In managed mode, the wireless network interface controller may control the communication of data with one or more other wireless device. Also, in managed mode, the wireless network interface controller may perform user mode scanning, which may gather general information about network conditions. The wireless network interface controller may include a mode control switch to change operation of the wireless network interface controller between monitor mode and managed mode.

Operation of the wireless network interface controller in monitor mode will now be discussed in more detail. As discussed above, monitor mode may be used to detect and analyze one or more condition of a network environment. Typically, operating a wireless network interface controller in monitor mode prohibits the wireless network interface controller from communicating data with other wireless devices. Thus, operating a wireless network interface controller in monitor mode generally causes a user to experience disconnection from a wireless network and interruption to data transmission. Since some network applications require constant data connections, or real-time communication characteristics, such disconnections and interruptions may be undesirable.

Operation of the wireless network interface controller in managed mode will now be discussed in more detail. As discussed above, managed mode may be used to communicate data over a wireless network with one or more other wireless devices. Typically, operating a wireless network interface controller in managed mode prohibits the wireless network interface controller from detecting detailed conditions of a network, such as network traffic for other users or wireless devices. However, while operating in managed mode, a wireless network interface controller may detect some general network information through user mode scanning.

User mode scanning allows a network to be scanned and monitored without requiring the wireless network interface controller to change from the managed mode to the monitor mode. User mode scanning may collect general network information, but does not recognize user or detailed wireless network traffic information. User mode scanning may advantageously be operated while the wireless network interface controller is in managed mode, thus not causing an interruption to data communication. Thus, if a particular data communication task requires a high data communication threshold of performance, scanning a network via user mode scanning typically will not affect compliance with the data communication threshold.

According to an embodiment of the present invention, the system may define a data communication threshold, which may target performance with approximately no perceivable interruptions of connectivity to a wireless network caused by changing operation of the wireless network interface controller between the managed mode and the monitor mode. While changing operation of the wireless network interface controller may result in some actual changes in connectivity or data communication performance, any such changes should generally not be perceivable to a user and provide a virtually seamless operating experience.

Figure 3:
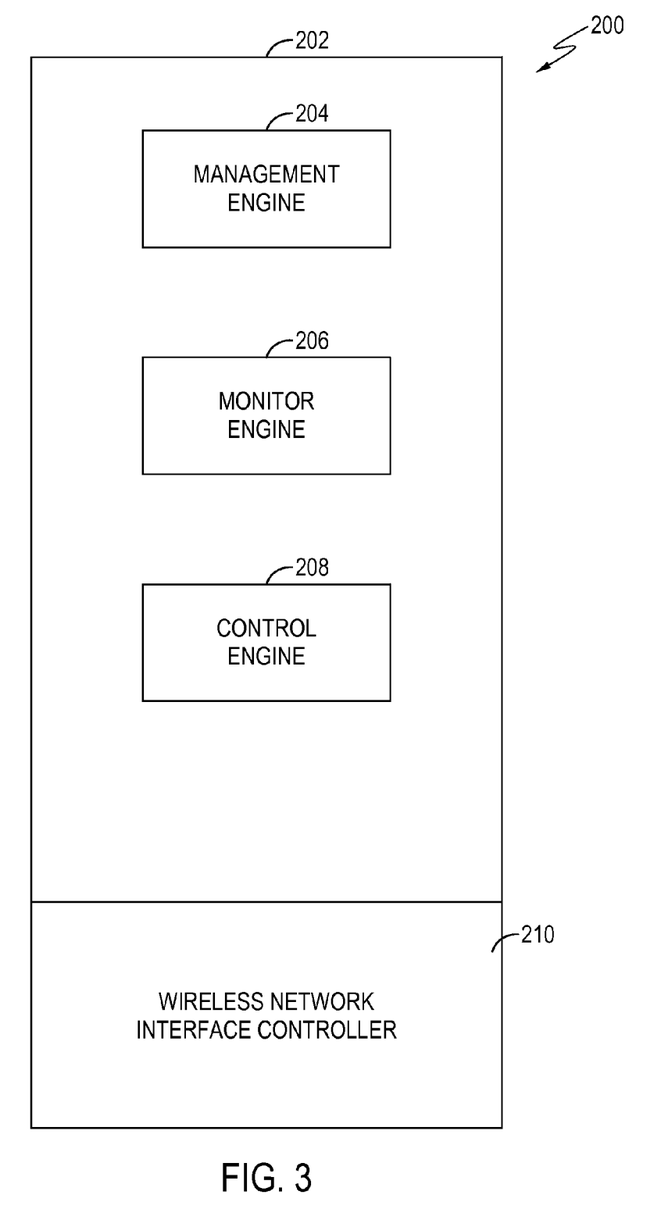
FIG. 3 is a schematic diagram showing the system.

As shown in FIG. 3, to control the operation of the wireless network interface controller, a system 200 may be operated on a computerized device 202 with a processor and memory to intelligently change a wireless network interface controller between managed mode and monitor mode. The computerized device 202 may communicate with the wireless network interface controller 210, for example, via a driver. The system 200 may include one or more engines to perform communication or analytical and control tasks. Skilled artisans will appreciate that an engine may include a group of instructions that can be executed via hardware and/or software. Such engines may include a management engine 204 to control communication of data over a wireless network, a monitor engine 206 to analyze one or more condition of the wireless network, and a control engine 208 to control operation of the management engine and the monitor engine within compliance with the data communication threshold. The management engine may manage the communication of data using the wireless network interface controller in managed mode. The management engine may also perform user mode scanning using the wireless network interface controller in managed mode. Similarly, the monitor engine may analyze one or more condition of the network using the wireless network interface controller in monitor mode. The control engine may selectively enable and/or disable managed mode and monitor mode as determined by assessing and analyzing one or more parameter. Optimally, the control engine may control the wireless network interface controller between managed mode and monitor mode to maintain compliance with the data communication threshold.

Skilled artisans will appreciate that each of the engines discussed above may operate collectively, independently, synchronously, or in another relation with one another. Each engine may control discrete instruction sets. Alternatively, the engines discussed above may be included in one uniform instruction set of the system and respectively define various operations performed by the system. Some operations may overlap. Additional engines may be included by the system. Those of skill in the art should not view this discussion of engines to limit the present invention in any way.

An illustrative computerized device will now be discussed in greater detail, without limitation. The computerized device may include a processor, memory, network controller, and optionally an input/output (I/O) controller. Skilled artisans will appreciate additional embodiments of a computerized device that may omit one or more of the aforementioned components or include additional components without limitation. The processor may receive and analyze data. The memory may store data, which may be used by the processor to perform the analysis. The memory may also receive data indicative of results from the analysis of data by the processor.

The memory may include volatile memory modules, such as random access memory (RAM), or non-volatile memory modules, such as flash based memory Skilled artisans will appreciate the memory to additionally include storage devices, such as, for example, mechanical hard drives, solid state data, and removable storage devices.

The computerized device may also include a network controller, which may be a wireless network interface controller. The network controller may receive data from other components of the computerized device to be communicated with other computerized devices via a network. The communication of data may be performed wirelessly. More specifically, without limitation, the network controller may communicate and relay information from one or more components of the computerized device, or other devices and/or components connected to the computerized device, to additional connected devices. Connected devices are intended to include data servers, additional computerized device, mobile computing devices, smart phones, tablet computers, and other electronic devices that may communicate digitally with another device.

The computer may also include an I/O interface. The I/O interface may be used to transmit data between the computerized device and extended devices. Examples of extended devices may include, but should not be limited to, a display, external storage device, human interface device, printer, sound controller, or other components that would be apparent to a person of skill in the art. Additionally, one or more of the components of the computerized device may be communicatively connected to the other components via the I/O interface.

The components of the computerized device may interact with one another via a bus. Those of skill in the art will appreciate various forms of a bus that may be used to transmit data between one or more components of an electronic device, which are intended to be included within the scope of this disclosure.

The computerized device may communicate with one or more connected devices via a network. The computerized device may communicate over the network by using its network controller. More specifically, the network controller of the computerized device may communicate with the network controllers of the connected devices. The network may be, for example, the internet. As another example, the network may be a WLAN. However, skilled artisans will appreciate additional networks to be included within the scope of this disclosure, such as intranets, local area networks, wide area networks, peer-to-peer networks, and various other network formats. Additionally, the computerized device and/or connected devices may communicate over a network via a wired, wireless, or other connection, without limitation.

In operation, the system may control one or more aspect of the wireless network interface controller to detect one or more condition of at least one network while providing transmission and reception of data in compliance with a data communication threshold. To determine compliance with the data communication threshold, the system may determine an anticipated period of time to engage the monitor mode, monitor the wireless network, engage the managed mode, and connect to a network. The anticipated period may be determined by assessing usage of the wireless network. The anticipated period may include a mode time of changing between the managed mode and the monitor mode and/or a connection time of the wireless network interface controller to connect to the wireless network in managed mode. The system may analyze an actual period between communication of a precedent communication and a subsequent communication. The system may then determine that its operation is compliant with the data communication threshold where the actual period is longer than the anticipated period.

Figure 1:
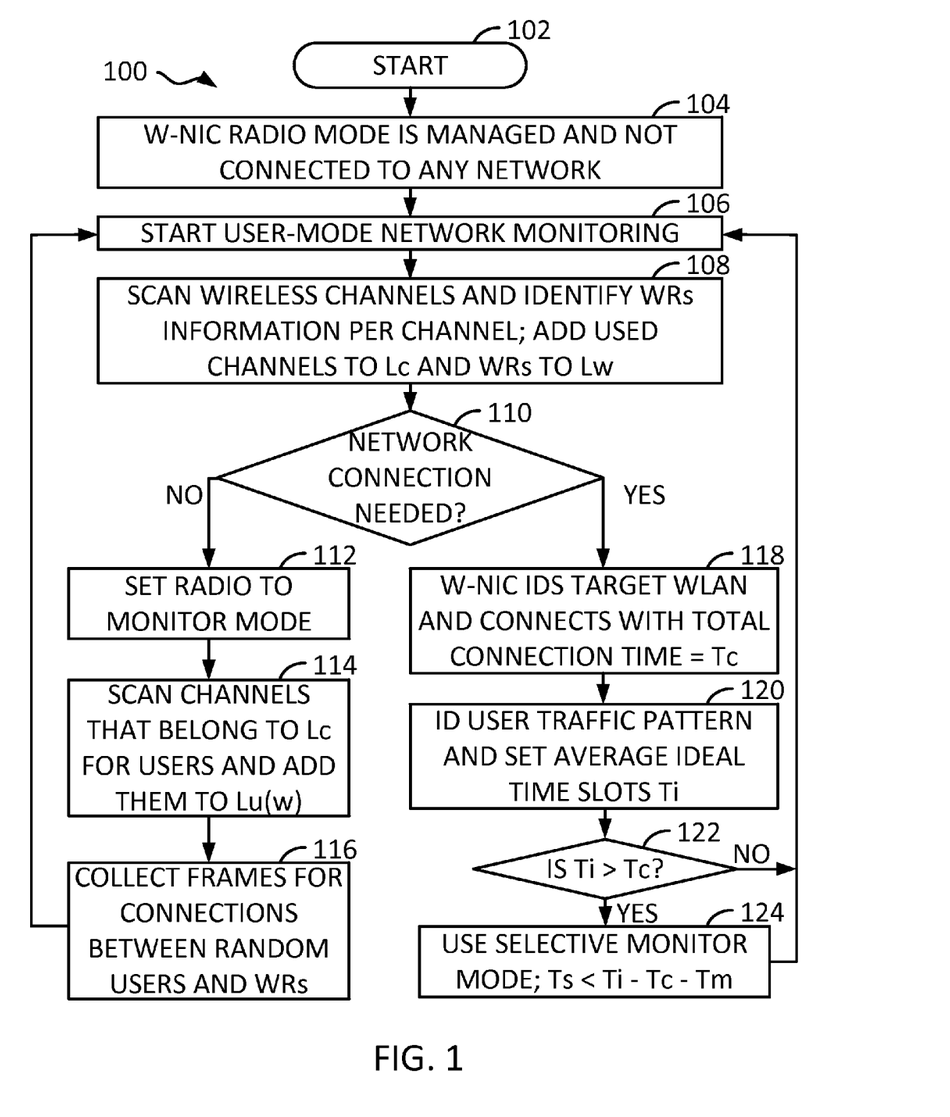
FIG. 1 is a flowchart illustrating an operation of the system, according to an embodiment of the present invention.

Along with reference to flowchart 100 of FIG. 1, a data communication and general data analysis operation will now be discussed. Starting at Block 102, the wireless network interface controller may be initially configured in managed mode. (Block 104). Here, the wireless network interface controller may be disconnected from available networks. The wireless network interface controller may then perform user mode scanning of available networks. (Block 106). Skilled artisans will appreciate that the wireless network interface controller may perform user mode scanning whether or not the wireless network interface controller is connected to a network.

During the user mode scanning, the wireless network interface controller may identify nearby wireless devices, such as wireless routers, and information about channel usage and access points that are operating on each wireless channel. (Block 108). The system may generate a list of used channels "Lc," which it may be populated with wireless channels that are detected to be in use. Additionally, the system may generate a list of wireless networks "Lw," which it may populate with detected wireless networks on the channels included by list Lc. Skilled artisans will appreciate that the information of lists Lc and Lw may be included in separate lists or a combined list. Additionally, one or more of the lists may be prioritized. By maintaining a list Lc of wireless channels, the system may advantageously focus analysis of the channels to only channels with wireless networks present, thus potentially saving a substantial amount of time by not unnecessarily analyzing unused wireless channels.

The system may then determine whether connection to a network is needed. (Block 110). For example, the system may determine whether a user desires to communicate data over a network or whether an application, such as VOIP, requires connection to a wireless network to transmit and/or receive data. If it determined at Block 110 that no connection to a network is required, the system may set the wireless network interface controller to monitor mode. (Block 112). The wireless network interface controller may then scan the wireless channels included by list Lc for users and add them to a list of users, "Lu." The list of users Lu may be created respective to a wireless network included by the list of wireless networks Lw, to create a list of users on a network "Lu(w)." The system may then collect frames for connections between users of the wireless network and the respective wireless receiver, as provided by list Lu(w). (Block 116). The scanning and collecting of frames may occur for each wireless network included by the list Lw. Additionally, the scanning and collecting of frames may occur respective to the wireless networks operating on each wireless channel included by list Lc. Here, the users scanned by the system may or may not be connected to a wireless network. The information detected regarding the users, wireless networks, and/or channels may be included in a list and/or database. The system may then return to the operation of Block 106, where it may again perform user mode scanning of available networks in managed mode as discussed above.

If it is determined at Block 110 that a network connection is needed, the system may identify a target wireless network and establish a connection. (Block 118). The system may record the time elapsed to connect to the network as a connection time "Tc." The system may then identify a user pattern and determine one or more ideal time slot "Ti." (Block 120). A user pattern may be identified according to network usage and application demands, such as by analyzing usage patterns, quality of service requirements, and/or acceptable network error rates. For example, some network applications may require a high Quality-of-Service (QoS) for real-time applications, such as VOIP. Applications with high QoS requirements may demand high data rates and minimal network interruptions, which may affect the analysis by the system of the ideal time Ti. Network data rate is affected by network error rate, where a higher network error rate results in a lower network data rate. If frames or packets of data are received with errors, or not received at all, the frames will need to be retransmitted. Retransmission of packets slows the data rate. Therefore, the ideal time Ti will be calculated by the system respective to at least one of the above discussed factors.

Figure 2:
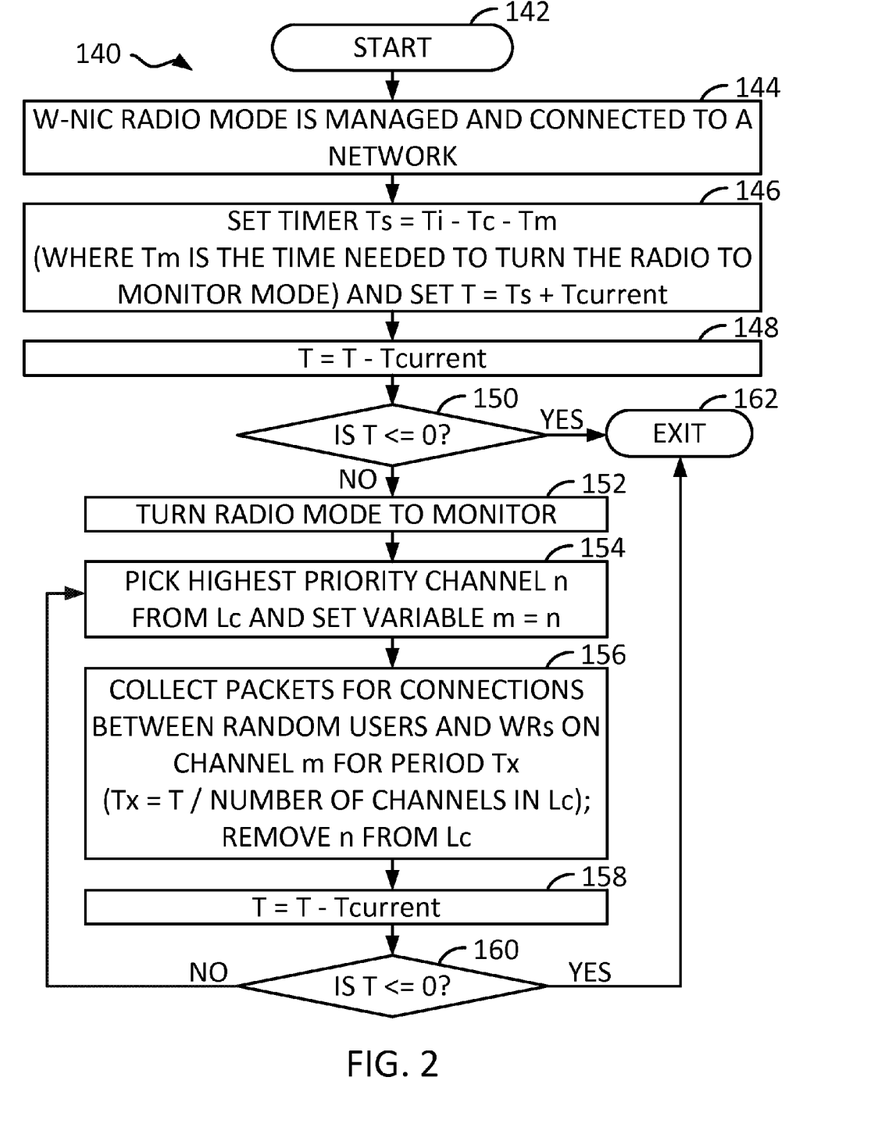
FIG. 2 is a flowchart illustrating a selective monitor operation of the system, according to an embodiment of the present invention.

After the ideal time Ti has been determined by the system at Block 120, the system may determine whether the ideal time Ti is greater than the connection time Tc required to connect to the network. (Block 122). If the connection time Tc is greater than the ideal time Ti, the system will remain in managed mode and return to the operation of Block 108, where it will again analyze the wireless channels via user mode scanning. Conversely, if it is determined at Block 122 that the ideal time Ti is greater than the connection time Tc, the system may selectively engage operation of the wireless network interface controller in monitor mode (Block 124). The system may determine a time needed to switch the wireless network interface controller between managed mode and monitor mode and record that time as a switch time "Ts." The switch time Ts may be set as less than the ideal time Ti, minus the connection time Tc and a time to change to modes "Tm." The operation in selective monitor mode will be described in greater detail along with flowchart 140, as illustrated in FIG. 2. After the operation of Block 124 has been completed, the system may return the operation of Block 106, wherein the system may again perform user mode scanning of available networks in managed mode as discussed above.

Referring now to flowchart 140 of FIG. 2, an operation of the system for selectively engaging monitor mode will now be discussed. Starting at Block 142, the system may initially be configured in managed mode and connected to a network (Block 144). The system may then set a timer with the switch time Ts, where Ts=Ti−Tc−Tm. (Block 146). As discussed above, Tm represents the time to change the operation of the wireless network interface controller between modes. A time T may also be set as the sum of the switch time Ts and the current time, "Tcurrent." The time T may then be updated by subtracting the current time Tcurrent from the previous value of time T, using the calculation T=T−Tcurrent. (Block 148).

The system may then determine whether the updated value for time T is less than or equal to zero. (Block 150). If it is determined at Block 150 that T is less than or equal to zero, the time to operate in monitor mode has expired and the selective monitor mode operation will exit. (Block 162). This determination may be made with or without previously switching from managed mode to monitor mode. The system may then return to another operation, for example, the operation of flowchart 100. Conversely, it if is determined at Block 150 that the updated value for time T is greater than zero, the system may change the wireless network interface controller to monitor mode. (Block 152). The system may then choose the highest priority channel included in list Lc for analysis. (Block 154). The system may internally designate the channel to be tracked by setting an identifier variable "m" to the current wireless channel to be analyzed "n."

Next, the system may perform network scanning and/or collect packets for connections between users and a wireless device, such as a wireless router, on the channel presently being analyzed. (Block 156). The present channel undergoing analysis may be defined within the system under variable "m." The system may scan the network for a default time "Tx," which may be a share of the time T divided among all the channels in list Lc. Skilled artisans will appreciate that as network conditions may differ, the default time Tx may vary for each channel. The default time Tx represents a competition between user mode scanning and an analysis performed during monitor mode. The default time Tx is preferably tuned to maintain performance within the data communication threshold.

After the channel has been scanned, the system may update the time T by subtracting the current time Tcurrent from the previous value of time T, where T=T−Tcurrent. (Block 158). The system may then determine whether the updated value for time T is less than or equal to zero. (Block 160). If it is determined at Block 160 that T is less than or equal to zero, the time to operate in monitor mode has expired and the selective monitor mode operation will exit. (Block 162). Conversely, if it is determined at Block 160 that the updated value for time T is greater than zero, the system may return to the operation of Block 152 and again perform an analysis of wireless networks on another channel, which may be the next highest priority channel.

According to an embodiment of the present invention, the system may include one or more aggressiveness stages, which may affect whether the system provides a greater priority to operating in managed mode or monitor mode Skilled artisans will appreciate that the system may include any number of aggressiveness stages, for example, 1, 2, 3, 4, 5, 6, 7, 8, 9, 10, 11, 12, 13, 14, 15, 16, 17, 18, 19, 20, or another number of aggressiveness stages. The aggressiveness stages may also span an approximately continuous range of aggressiveness, for example various stages between a high aggressiveness stage and a low aggressiveness stage. Illustratively, the system may include a high aggressiveness stage that prioritizes operation in monitor mode at the expense of data throughput and connectivity. Conversely, for example, the system may include a low aggressiveness stage that prioritizes operation in managed mode at the expense of detailed analysis of available wireless networks.

As the aggressiveness stage is altered, the value for the default time Tx may be altered to reflect the desired aggressiveness. For example, selecting a high aggressiveness stage may be accomplished by the system setting the default time Tx to a larger value. As the value of the default time Tx increases, more network information may be collected on a scanned channel. Alternatively, respective to a low aggressiveness stage, the value of the default time Tx may be decreased, allocating a greater time for the wireless network interface controller to operate in managed mode.

In an embodiment of the present invention, the ideal time Ti may be dynamically adjusted to account for changing user and application demands. For example, changes in user habits or starting of a new application may not have previously been recognized by the system, but may require more network time for data communication. Here, the system may reduce the ideal time Ti to reflect the new usage requirements. If a user or application demands an approximately constant connection, the ideal time Ti may be reduced to expire the time T automatically and obligate the wireless network interface controller to return to operation in managed mode.

In another embodiment of the present invention, the system may collect frames for users communicating on a same scanned channel during monitor mode periods.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A system for managing a wireless network interface controller comprising:

a management engine to control communication of data over a wireless network using the wireless network interface controller operating in a managed mode;

a monitor engine to analyze a condition of the wireless network using the wireless network interface controller operating in a monitor mode;

a control engine to control operation of the management engine and the monitor engine in compliance with a data communication threshold, wherein a mode time of changing between the managed mode and the monitor mode is assessed to determine compliance with the data communication threshold;

wherein user mode scanning is performable by the management engine to determine a general characteristic of the wireless network in the managed mode;

wherein the user mode scanning does not significantly affect the compliance with the data communication threshold;

wherein wireless network traffic information is detectable by the wireless network interface controller operating in the monitor mode;

wherein the control engine selectively enables the managed mode and the monitor mode by manipulating a mode control switch of the wireless network interface controller.

2. The system of claim 1, wherein the data communication threshold targets performance with approximately no perceivable interruptions of connectivity to the wireless network caused by changing operation between the managed mode and the monitor mode.

3. The system of claim 1, wherein the data communication threshold is alterable to reflect an aggressiveness stage, wherein a high aggressiveness stage prioritizes efficiently operating in the monitor mode, and wherein a low aggressiveness stage prioritizes efficiently operating in the managed mode.

4. The system of claim 1:
wherein the compliance with the data communication threshold is determined by the system where an actual period between a precedent communication of the data and a subsequent communication of the data is longer than an anticipated period to engage the monitor mode, monitor the wireless network in the monitor mode, engage the managed mode, and connect to the wireless network in the managed mode;
wherein the anticipated period is determined by assessing usage of the wireless network;
wherein the anticipated period comprises the mode time of changing between the managed mode and the monitor mode; and
wherein the anticipated period comprises a connection time of the wireless network interface controller connecting to the wireless network in the managed mode.

5. The system of claim 4, wherein the assessing the usage of the wireless network is dynamically determined by analyzing usage patterns, quality of service requirements, and acceptable network error rates.

6. The system of claim 1, wherein the system controls the wireless network interface controller by operating a driver.

7. The system of claim 1, wherein a list of wireless networks is generated and populated with a wireless network on a selected channel, and wherein the list of wireless networks is prioritized to efficiently analyze the condition of the wireless network in the list of wireless networks.

8. A method for operating a wireless network interface controller, the method being performed on a computerized device with a processor and memory, the method comprising the steps of:
(a) controlling the wireless network interface controller between a managed mode and a monitor mode by manipulating a mode control switch of the wireless network interface controller to operate in compliance with a data communication threshold;
(b) controlling communication of data over a wireless network using the wireless network interface controller while operating in the managed mode;
(c) performing user mode scanning while operating in the managed mode to determine a general characteristic of the wireless network; and
(d) analyzing a condition of the wireless network using the wireless network interface controller while operating in the monitor mode;
wherein step (a) further comprises the step of:
(e) assessing a mode time of changing between the managed mode and the monitor mode;
wherein the user mode scanning does not significantly affect the compliance with the data communication threshold;
wherein the data communication threshold targets performance with approximately no perceivable interruptions of connectivity to the wireless network caused by changing operation between the managed mode and the monitor mode;
wherein wireless network traffic information is detectable by the wireless network interface controller operating in the monitor mode;
wherein the data communication threshold is alterable to reflect an aggressiveness stage, wherein a high aggressiveness stage prioritizes efficiently operating in the monitor mode, and wherein a low aggressiveness stage prioritizes efficiently operating in the managed mode.

9. The method of claim 8 wherein changing between the managed mode and the monitor mode of step (a) further comprises the steps of:
(f) engaging the monitor mode,
(g) analyzing the wireless network in the monitor mode,
(h) engaging the managed mode, and
(i) connecting to the wireless network in the managed mode.

10. The method of claim 8, wherein determining the compliance with the data communication threshold comprises the steps of:
(j) assessing usage of the wireless network;
(k) assessing a connection time of the wireless network interface controller to connect to the wireless network in the managed mode;
(l) analyzing assessments of steps (e), (j), and (k) to determine an anticipated period; and
(m) determining compliance with the data communication threshold where an actual period between a precedent communication of the data and a subsequent communication of the data is longer than the anticipated period.

11. The method of claim 10, wherein assessing the usage of the wireless network of step (j) is dynamically determined by analyzing usage patterns, quality of service requirements, and acceptable network error rates.

12. The method of claim 8, further comprising the step of:
(n) controlling the wireless network interface controller by operating a driver.

13. The method of claim 8, further comprising the steps of:
(o) generating a list of wireless networks;

(p) populating the list of wireless networks with a wireless network on a selected channel;
(q) prioritizing the list of wireless networks to efficiently analyze the condition of each wireless network in the list of wireless networks; and
(r) analyzing the wireless network in the list of wireless networks.

14. A method for operating a wireless network interface controller, the method being performed on a computerized device with a processor and memory, the method comprising:
(a) controlling the wireless network interface controller between a managed mode and a monitor mode by manipulating a mode control switch of the wireless network interface controller to operate in compliance with a data communication threshold;
(b) controlling communication of data over a wireless network using the wireless network interface controller while operating in the managed mode;
(c) performing user mode scanning while operating in the managed mode to determine a general characteristic of the wireless network; and
(d) analyzing a condition of the wireless network using the wireless network interface controller while operating in the monitor mode;
wherein the user mode scanning does not significantly affect the compliance with the data communication threshold;
wherein changing between the managed mode and the monitor mode of step (a) further comprises:
(e) engaging the monitor mode,
(f) analyzing the wireless network in the monitor mode,
(g) engaging the managed mode, and
(h) connecting to the wireless network in the managed mode;
wherein determining the compliance with the data communication threshold comprises:
(i) assessing usage of the wireless network,
(j) assessing a mode time of changing between the managed mode and the monitor mode,
(k) assessing a connection time of the wireless network interface controller to connect to the wireless network in the managed mode,
(l) analyzing assessments of steps (i), (j), and (k) to determine an anticipated period, and
(m) determining compliance with the data communication threshold where an actual period between a precedent communication of the data and a subsequent communication of the data is longer than the anticipated period.

15. The method of claim 14, wherein the data communication threshold targets performance with approximately no perceivable interruptions of connectivity to the wireless network caused by changing operation between the managed mode and the monitor mode.

16. The method of claim 14, wherein wireless network traffic information is detectable by the wireless network interface controller operating in the monitor mode.

17. The method of claim 14, wherein the data communication threshold is alterable to reflect an aggressiveness stage, wherein a high aggressiveness stage prioritizes efficiently operating in the monitor mode, and wherein a low aggressiveness stage prioritizes efficiently operating in the managed mode.

18. The method of claim 14, wherein assessing the usage of the wireless network of step (i) is dynamically determined by analyzing usage patterns, quality of service requirements, and acceptable network error rates.

19. The method of claim 14, further comprising:
(n) controlling the wireless network interface controller by operating a driver.

20. The method of claim 14, further comprising:
(o) generating a list of wireless networks;
(p) populating the list of wireless networks with a wireless network on a selected channel;
(q) prioritizing the list of wireless networks to efficiently analyze the condition of each wireless network in the list of wireless networks; and
(r) analyzing the wireless network in the list of wireless networks.

* * * * *